United States Patent Office 3,365,014
Patented Jan. 23, 1968

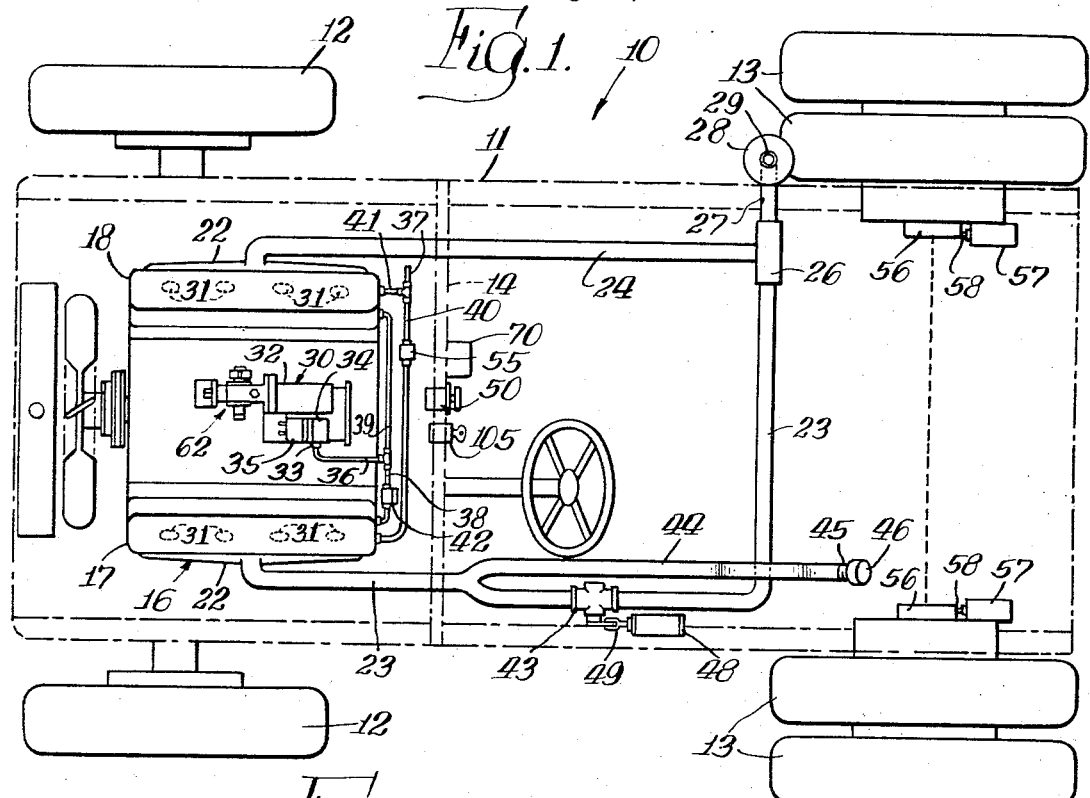
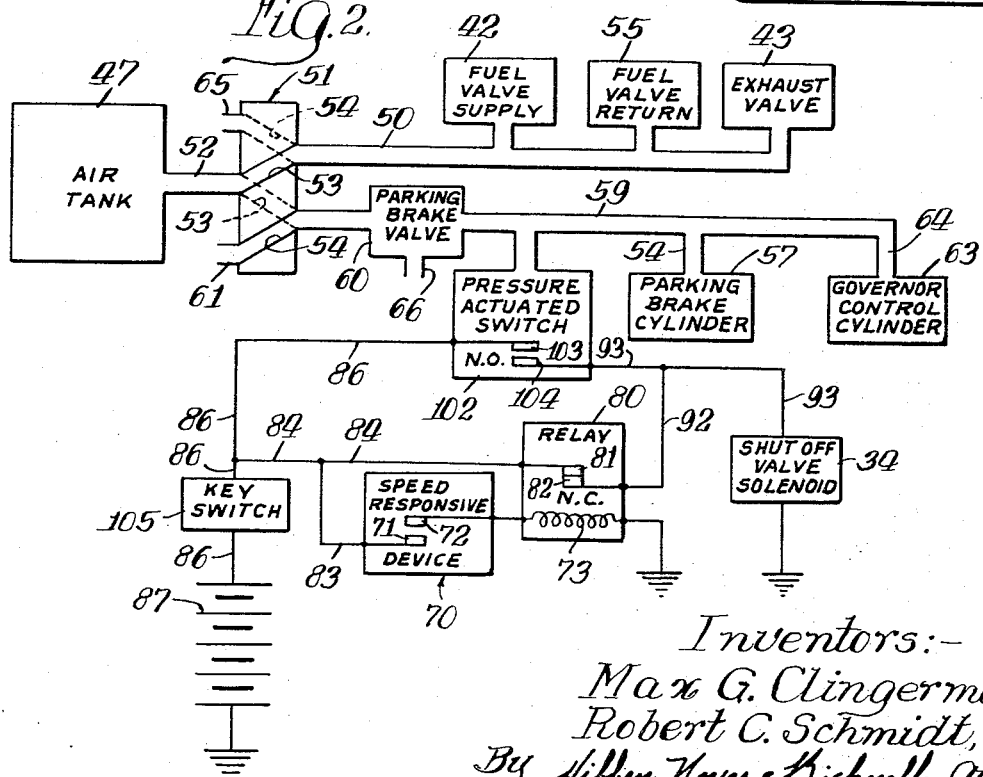

3,365,014
COMBINATION VEHICLE ENGINE AND SELF-POWERED AIR COMPRESSOR
Max G. Clingerman and Robert C. Schmidt, Columbus, Ind., assignors to Cummins Engine Company, Inc., Columbus, Ind., a corporation of Indiana
Filed Aug. 11, 1965, Ser. No. 478,901
12 Claims. (Cl. 180—54)

ABSTRACT OF THE DISCLOSURE

Apparatus for converting a multi-cylinder internal combustion engine for operation as a self-powered air compressor. A fluid pressure actuated valve in a fuel supply branch passage connected to at least one cylinder of the engine and another fluid pressure actuated valve in an exhaust branch conduit connected to the one cylinder are provided for respectively shutting off the flow of fuel to the one cylinder and for diverting the exhaust therefrom to an auxiliary outlet when the engine is converted for operation as a self-powered air compressor. A control for the fluid pressure actuated valves may be used to limit the flow of fuel to the driving cylinder or cylinders of the engine to prevent the engine from exceeding a predetermined speed when the latter is operating as a self-powered air compressor and also to actuate the parking brake of a vehicle in which the engine is mounted when the latter is functioning as a self-powered air compressor.

---

This invention relates to air compressors, and more particularly to apparatus for converting a multi-cylinder diesel engine for operation as a self-powered air compressor.

It has heretofore been proposed in vehicles powered by internal combustion engines to convert one or more of the cylinders of the engine for use as an air compressor while one or more of the remaining cylinders functions to drive the air compressing cylinder or cylinders. So far as is known, such proposals have been confined solely to in-line, spark-ignition type engines, and have proved more or less satisfactory for their intended purpose. However, apparently no successful attempt has been made to convert a diesel engine for such operation.

Accordingly, it is a general object of the present invention to provide novel apparatus whereby a diesel engine having at least two cylinders may be operated solely as an engine or may be converted for operation as a self-powered air compressor with one cylinder utilized to compress air and the other cylinder to drive the one cylinder.

Another object is to provide a novel apparatus of the foregoing character, having fluid pressure actuated means for shutting off fuel flow to the cylinder or cylinders which function as an air compressor and for diverting the discharge from such cylinder or cylinders to an auxiliary outlet when the engine is operating as a self-powered air compressor, and in which a valve is provided for controlling the application of fluid under pressure to and the exhaust of such fluid from said means.

A further object is to provide novel apparatus of the character described, which limits the speed of the engine to a predetermined speed when functioning as a self-powered air compressor.

A more particular object is to provide a novel apparatus for converting one bank of a V-type diesel engine for operation as an air compressor while the other bank serves as a driver for the one bank.

A still further object is to provide a novel apparatus of the foregoing character arranged so that the injector or injectors for the cylinders functioning as an air compressor are lubricated during the period when such cylinders are so functioning.

Still another object is to provide a novel apparatus of the character described which may be installed on existing diesel engines, is relatively inexpensive, and is reliable in operation.

These and other objects will become apparent from the following detailed description and accompanying sheet of drawings, in which:

FIG. 1 is a semi-diagrammatic top plan view of a diesel engine powered tractor, the latter including apparatus embodying the features of the invention for converting the engine for operation as a self-powered air compressor; and FIG. 2 is a combined block and electrical wiring diagram showing the components and electrical circuit of the apparatus shown in FIG. 1.

In FIG. 1, a diesel engine powered tractor unit 10 is diagrammatically illustrated, the latter being exemplary of one type of vehicle with which the present invention is adapted for use. Only the chassis of the unit 10 has been illustrated in order to better illustrate the various components of the invention to be hereinafter described. Thus, the tractor unit 10 is shown as comprising a frame 11 which is supported by a pair of steerable front wheels 12 and a pair of dual rear drive wheels 13. A cab (not shown) is mounted on the frame and a dashboard 14 is provided for receiving the usual vehicle instruments.

The tractor unit 10, in the present instance, is powered by a V-type diesel engine 16 having left and right banks of cylinders 17 and 18, respectively, and an exhaust manifold 22 for each bank of cylinders. Left and right exhaust pipes 23 and 24, respectively, are connected to the manifolds 22 and to a common muffler 26 located toward the rear of the frame 11. When the engine 16 is functioning in a normal manner, exhaust gases from both cylinder banks 17 and 18 flow through the muffler 26 and thence flow upwardly through a length of pipe 27 to another cab side mounted muffler 28 for discharge from a stack 29 at the upper end of the muffler 28.

The engine 16 also includes a fuel supply apparatus for supplying fuel from a source such as a fuel tank (not shown), to the cylinders of the engine. As shown, such apparatus comprises an engine driven fuel supply unit 30 mounted between the cylinder banks 17 and 18 for supplying fuel to the injectors for the respective cylinders, indicated at 31, of the engine 16. Each injector 31 includes a reciprocable plunger (not shown) for injecting a quantity of fuel into its associated cylinder in timed relation with the speed of the engine. The fuel supply unit 30 includes a housing 32 having a fuel inlet (not shown) and a fuel outlet 33, the latter being provided with a shut-off valve 34 mounted on the housing 32, the shut-off valve 34 being adapted to be held open by a solenoid 35 when the latter is energized, the valve 34 closing when the solenoid is deenergized.

The fuel supply apparatus also includes a fuel supply line 36 and a fuel return line 37. One end of the fuel supply line 36 is connected to the outlet 33 of the unit 30 and the other end thereof is connected to a pair of branch supply lines or passages 38 and 39 which are connected to fuel supply passages in the injectors 31, the branch line 38 supplying fuel to the injectors 31 in the left bank 17 and the branch line 39 supplying fuel to the injectors 31 in the right bank 18. One end of the return line 37 is connected to a source of fuel, such as the fuel tank of the vehicle, and the other end thereof is connected to a pair of branch return lines or passages 40 and 41 which are connected to fuel return passages in the injectors 31, the branch line 40 receiving fuel from the injectors 31 in the left bank 17 and the branch line 41 receiving fuel from the injectors 31 in the right bank 18.

Thus, when the engine 16 is operating in a normal manner, the fuel supply branch lines 38 and 39 serve to supply fuel, at a controlled pressure from the unit 30, to the fuel supply passages in the injectors 31 in the respective banks 17 and 18, and the return branch lines 40 and 41 serve to return excess fuel supplied to the injectors to the fuel tank of the vehicle, such fuel entering the return branch lines 40 and 41 from the return passages in the injectors.

According to the invention, the tractor unit 10 includes means for converting the engine 16 for operation as a self-powered air compressor so that a supply of air under pressure may be made available for various purposes, such as to assist removal or unloading of granular or powdered cargoes from an associated trailer, or for other purposes. Such means is effective, when actuated, to convert at least one of the cylinders of the engine 16 for operation as an air compressor while the remaining cylinders serve as a driver for the one cylinder. Since the engine 16 is of the V-type, preferably all of the cylinders of one bank, such as the left bank 17, are converted for operation as an air compressor while all of the cylinders of the other bank, such as the right bank 18, serve as a driver for the left bank.

For this purpose, a first valve means 42 is provided in the fuel branch supply line 38 which supplies fuel to the injectors 31 in the left bank 17 of the cylinders, and a second valve means 43 is provided in the exhaust pipe 23 upstream of its connection with the muffler 26 for diverting a flow of compressed air from the cylinders of the left bank 17 to an auxiliary outlet, when the engine is functioning as a self-powered air compressor. Such auxiliary outlet, in the present instance, comprises a length of pipe 44 having one end connected to the exhaust pipe 23 between the manifold 22 and valve means 43 and its other end 45 terminating toward the rear of the tractor 10, the end 45 preferably being provided with a removable cap 46.

The valve means 42 and 43 may be actuated by any desired means, but, in the present instance, they are shown as being actuated by fluid under pressure, such as compressed air. To this end, the valve means 42 includes a shiftable air-actuated member (not shown) for closing the valve means when fluid under pressure, such as compressed air from a storage tank 47, is applied thereto. The valve means 42 is returned to an open position as by a spring (also not shown) when the compressed air is exhausted from the valve means.

The valve means 43 is actuated in a manner similar to the valve means 42 and thus includes a cylinder 48 having an extensible and retractable plunger 49 connected to the valve means 43. The cylinder 48 is effective when fluid under pressure, such as compressed air from the storage tank 47, is applied thereto to move the plunger 49 in a direction to close the valve means 43. When compressed air is exhausted from the cylinder 47, a spring (not shown) shifts the plunger 49 in a direction to open the valve means 43. Conduit means in the form of a pipe 50 is provided for connecting the valve means 42 and 43 with the compressed air tank 47.

For controlling communication between the tank 47 and valve means 42 and 43, valve means such as a four-way valve 51 having a pipe 52 connected to the tank 47, is connected to the pipe 50. The valve 51 is shown as having a passage 53 therethrough, and such communication is established when the passage 53 is in its full line position shown in FIG. 2. The valve 51 also includes another passage 54 which serves to exhaust compressed air from the pipe 50 and valve means 42 and 43 when the passage 54 is in its dotted line position in FIG. 2.

With the foregoing construction, when the valve 51 is positioned so that compressed air from the tank 47 is applied through the pipe 50 to the valve means 42 and 43, the valve means 42 will shut off fuel flow to the injectors 31 of the cylinders in the left bank 17 so that these cylinders will function as an air compressor, and the valve means 43 will cause the compressed air from these cylinders to be diverted through the auxiliary pipe 44 for use in an associated trailer or for some other purpose. The cap 46 is, of course, removed at this time. The cylinders of the right bank continue to operate as an engine to drive the cylinders of the left bank 17. Shifting of the valve 51 to a position to bring the passage 54 thereof into its dotted line position in FIG. 2 shuts off the connection with the tank 47 and connects the passage 54 with the pipe 50 and with an exhaust port 65 in the valve 51. Air under pressure in the pipe 50 will thus be exhausted from the pipe 50 and valve means 42 and 43 to return the engine to normal operation.

As heretofore mentioned, each injector 31 of the engine 16 includes a reciprocable plunger for injecting a predetermined quantity of fuel into its associated cylinder in timed relation with the speed of the engine. During normal operation of the engine, the injector plungers in both banks are lubricated by fuel in the fuel passages in the injectors. However, when the engine 16 is functioning as a self-powered air compressor and the valve means 42 in the branch supply line 38 is closed to shut off fuel flow to the injectors 31 in the left bank 17, after a certain period of operation the fuel in the passages in these injectors would dissipate, primarily by flowing back to the fuel tank by way of the branch return line 40 and return line 37. When such dissipation occurs, the plungers in the injectors 31 of the left bank 17 may not receive sufficient lubrication and damage to the plungers may occur.

To prevent this, another or third valve means 55 (FIGS. 1 and 2) is provided in the fuel branch return line 40. The valve means 55 may be actuated by any desired means, but, in the present instance, is shown as being actuated by means similar to the valve means 42 and 43. Thus, the valve means 55 is connected to the pipe 50 and includes a shiftable air-actuated member (not shown) for closing the valve means 55 when fluid under pressure, such as compressed air from the tank 47, is applied thereto. The valve means 55 is returned to an open position as by a spring (not shown) when the compressed air is exhausted from the valve means.

Thus, when the four-way valve 51 is positioned so that the passage 53 thereof is in its full line position shown in FIG. 2, compressed air from the tank 47 will also be applied through the pipe 50 to the valve means 55 to close the latter. Communication between the branch return line 40 and return line 37 will thus be interrupted so that fuel will be confined in the passages in the injectors 31 of the left bank 17. Such fuel will thus be available to lubricate the injector plungers of the injectors in the left bank 17 when the engine 16 is functioning as a self-powered air compressor.

When the engine 10 is functioning as a self-power air compressor, it is desirable to prevent movement of the tractor unit 10. To this end, auxiliary or parking brake means is provided in addition to the usual service brakes. As shown in FIG. 1, two parking brakes 56 are provided, one for each dual rear wheel 13.

The parking brakes 56 are preferably of the self-applying pressure release type and thus each includes a spring (not shown) for applying the brakes and a cylinder 57 and plunger 58 for releasing the brake when fluid under pressure, such as air from the tank 47, is applied to the cylinder. To this end, conduit means in the form of a pair of pipes 59, only one of which is shown in FIG. 2, are provided for connecting the cylinders 57 with the tank 47. Communication between the parking brake cylinder 57 and tank 47 is controlled by the valve 51 and the passage 53 therein. Such communication is established when the passage 53 is in its dotted line position shown in FIG. 2. The pipes 59 may also include additional control valves 60 therein, which normally permti communication between the four-way valve 51 and parking brake cylinders 57. Air under pressure is exhausted from the pipes 59 and the brake cylinders 57 through an exhaust port 61 in the valve 50 to permit application of the brakes 56 when the valve 50 is positioned so that the passage 54 is in its full line position in FIG. 2.

When the engine 16 is functioning as a self-powered air compressor, it is desirable to prevent the engine from exceeding a predetermined pumping speed. To this end, governor means 62 cooperating with the fuel supply unit 30 is provided for this purpose. The governor means 62 is preferably adjusted to limit the engine speed to such predetermined speed at the same time that the parking brakes 56 are applied. Thus, the governor means 62 includes an air cylinder, indicated diagrammatically at 63 in FIG. 2, which is connected as at 64 with one of the air supply pipes 59. The air cylinder 63 includes a plunger (not shown) which coacts with the fuel supply unit 30 to render the latter effective to limit the flow of fuel to the injectors of the engine and thus prevent the engine from exceeding a predetermined pumping speed. The arrangement is such that when the pipes 59 and consequently the cylinder 63 is exhausted, the governor means 62 will cause the fuel supply unit 30 to limit fuel flow to the engine to prevent the latter from exceeding its predetermined pumping speed and when the pipe 59 and cylinder 63 receive air under pressure from the tank 47, the governor means 62 renders the fuel supply unit 30 effective to supply the normal fuel requirements of the engine so that the latter may operate at speeds above the predetermined pumping speed.

Thus, when it is desired to convert the engine 16 for operation as an air compressor, the four-way valve 51 is positioned so that the passages 53 and 54 thereof occupy their full line positions shown in FIG. 2. Compressed air from the tank 47 will thus be applied to the valve means 42, 43 and 55 to close these. At the same time, air under pressure will be exhausted from the parking brake cylinders 57 and governor cylinder 63 through the exhaust port 61 to set the parking brakes of the vehicle and adjust the governor means 62 so that the fuel supply unit 30 will be rendered effective to limit fuel flow to the engine and prevent the latter from exceeding its predetermined pumping speed. The cylinders in the left bank 17 of the engine will thus operate as an air compressor, the cylinders of the right bank 18 serving to drive the cylinders of the left bank.

Conversely, when the engine has been functioning as an air compressor and it is desired to return the engine to normal operation, the four-way valve 51 is positioned so that the passages 53 and 54 occupy their dotted line position shown in FIG. 2. Air under pressure will then be exhausted from the valve means 42, 43 and 55 through the exhaust port 65 and air under pressure will be applied to the parking brake cylinders 57 and governor cylinder 63. The engine 16 will thus be returned to normal operation.

With the foregoing construction, it will be apparent that the engine 16 may be effectively converted for operation as a self-powered air compressor under the control of the four-way valve 51 and when so converted is protected by the governor means 62 against damage due to overspeeding. As a further safeguard against damage due to overspeeding when the engine is functioning as an air compressor, additional means cooperating with the fuel supply unit 30 is provided, should the governor means 62 fail to function. Such means, in the present instance, comprises a speed responsive device 70 for interrupting the flow of current to the solenoid 35 of the shut-off valve 34 to thus cause the latter to close and prevent fuel flow to the engine.

The device 70, in the present instance, includes a pair of normally open contacts 71 and 72 which are in circuit with the coil, indicated at 73, of a relay 80 having a pair of normally closed contacts 81 and 82. The other side of the coil 73 is grounded. Current is supplied to the contact 71 by connected wires 83, 84 and 86, the wire 86 being connected to the battery, indicated at 87, of the vehicle. The wire 84 is also connected to the contact 81 of the relay 80 and the contact 82 of the relay 80 is connected by wires 92 and 93 to one terminal of the solenoid 35 which actuates the shut-off valve 34. The other terminal of the solenoid 35 is grounded.

Thus, when the contacts 81 and 82 of the relay 80 are closed, current from the battery 87 may flow through the wires 86 and 84, contacts 81 and 82, wires 92 and 93 to the solenoid 35 to energize the latter and open the shut-off valve 34. However, if for some reason the governor means 62 should malfunction when the engine 16 is operating as a self-powered air compressor, the speed responsive device 70 will deenergize the solenoid 35 and permit the shut-off valve 34 to close and thus stop fuel flow to the engine. The device 70 is usually adjusted so that its contacts 71 and 72 will close when the engine reaches a speed somewhat in excess of the speed for which the governing means 62 is set.

When the engine 16 is functioning in a normal manner and not as a self-powered air compressor, the device 70 becomes inoperable to deenergize the solenoid 35. For this purpose, a normally open, fluid pressure actuated switch 102 is provided. Thus, the switch 102 includes a pair of normally open contacts 103 and 104, the contact 103 being connected to the wire 86 and the contact 104 being connected to the wire 93 as illustrated in FIG. 2. The switch 102 is connected to one of the pipes 59 so that the contacts 103 and 104 will close when fluid pressure is applied thereto to provide a parallel circuit around the relay 80 when the four-way valve 51 is positioned to supply compressed air to the pipes 59. This, of course, is the condition of the system when the engine is functioning in a normal manner. With the contacts 103 and 104 closed, current flow to the shut-off valve solenoid 35 will not be interrupted, even though the relay contacts 81 and 82 may open. A dash mounted key switch 105 is provided in the wire 86 to permit shut down of the engine by the driver at any time.

If it is desired to set the parking brake 56 without converting the engine to a self-powered air compressor, the valve 60 may be shifted to a position to disconnect the parking brake cylinders 57 from the air tank 47 and to connect the pipes 59 and hence the parking brake cylinders 63 to exhaust through an exhaust port 66 in the valve 60. Thus the parking brake will be applied under such conditions although the position of the four-way valve 51 has not been changed and the cylinders in the left bank 17 are not operating as an air compressor.

From the foregoing, it will be apparent that the apparatus of the present invention is effective when actuated to convert at least one of the cylinders of a diesel engine for operation as an air compressor while one or more of the other cylinders functions as a driver. Specifically, the apparatus is effective to convert one bank of cylinders of a V-type diesel engine for operation as an air compressor while the other bank functions as a driver. The apparatus also includes means for assuring adequate lubrication of the plungers of the injectors associated with cylinders of the bank which functions as an air compressor and governor means for limiting the speed of the engine to a predetermined safe speed when functioning as an air compressor. In addition, a secondary or backup speed-responsive device is provided in the event of failure of the governor means. Moreover, the engine may be operated normally or readily converted for operation as a self-powered air compressor by manipulation of a four-way valve.

We claim:

1. In a compression-ignition engine having at least two cylinders, fuel supply means for said engine including a fuel supply conduit having branch passages connected to the respective cylinders, exhaust means for discharging exhaust products from said cylinders including branch conduits connected to the respective cylinders, the branch conduit connected to one of said cylinders having an auxiliary outlet, means for converting said engine to a self-powered air compressor comprising first valve means in the fuel supply branch passage connected to said one cylinder operable when actuated to shut off the flow of fuel to said one cylinder, second valve means in the branch conduit connected to said one cylinder operable when actuated to divert the exhaust to said auxiliary outlet, whereby, when both of said valve means are actuated, the other of said cylinders functions as a driver for said one cylinder and said one cylinder is effective to deliver air under pressure at said auxilitry outlet, a source of fluid under pressure, and conduit means connecting said first and second valve means with said source to actuate said first and second valve means.

2. The combination of claim 1, in which manually controlled valve means is provided in said conduit means for controlling the application of fluid under pressure to said first and second valve means.

3. In a compression-ignition engine having at least two cylinders, fuel supply apparatus for said engine including a source of fuel, and a fuel supply conduit having branch passages adapted to be connected to fuel injectors for the respective cylinders for supplying fuel from said source to said injectors, each injector being adapted to inject a quantity of fuel into its associated cylinder, said fuel supply apparatus also including a fuel return conduit having branch passages adapted to be connected to the respective injectors for returning fuel from the injectors to said source, exhaust means for discharging exhaust products from said cylinders including branch conduits connected to the respective cylinders, the branch conduit connected to one of said cylinders having an auxiliary outlet, means for converting said engine to a self-powered air compressor comprising first valve means in the fuel supply branch passage for the injector associated with said one cylinder and operable when actuated to shut off the flow of fuel to said injector, second valve means in the exhaust branch conduit connected to said one cylinder and operable when actuated to divert the exhaust to said auxiliary outlet, and third valve means in the fuel return branch passage for the injector associated with said one cylinder and operable when actuated to prevent a return flow of fuel from said injector to said source, whereby said first and second valve means are effective when actuated to render said one cylinder effective to deliver air under pressure at said auxiliary outlet with said other cylinder functioning as a driver and said third valve means is effective to retain fuel in said injector associated with said one cylinder to lubricate said injector when said one cylinder is functioning as an air compressor.

4. The combination of claim 3, including a source of fluid under pressure, and conduit means connecting said first, second and third valve means with said source of fluid under pressure to actuate said valve means.

5. In a V-type diesel engine having at least two banks of cylinders with a plurality of cylinders in each bank, fuel supply means for said engine including a fuel supply conduit having branch passages connected to the respective banks for supplying fuel to the cylinders therein, exhaust means for discharging exhaust products from said cylinders including branch conduits connected to the respective banks, the exhaust branch conduit connected to one of said banks having an auxiliary outlet, means for converting said engine to a self-powered air compressor comprising first valve means in the fuel supply branch passage connected to said one bank and operable when actuated to shut off fuel flow to said one bank, second valve means in the exhaust branch conduit connected to said one bank and operable when actuated to divert the exhaust from said one bank to said auxiliary outlet, whereby, when both of said valve means are actuated, the other bank functions as a driver for said one bank and said one bank is effective to deliver air under pressure at said auxiliary outlet, a source of fluid under pressure, and conduit means connecting said first and second valve means with said source to actuate said first and second valve means.

6. In a compression-ignition engine having at least two cylinders, fuel supply means for said engine including a fuel supply conduit having branch passages connected to the respective cylinders, exhaust means for discharging exhaust products from said cylinders including branch conduits connected to the respective cylinders, the exhaust branch conduit connected to one of said cylinders having an auxiliary outlet, means for converting said engine to a self-powered air compressor comprising first valve means in the fuel supply branch passage connected to said one cylinder and operable when actuated to shut off fuel flow to said one cylinder, second valve means in the exhaust branch conduit connected to said one cylinder and operable when actuated to divert the exhaust from said one cylinder to said auxiliary outlet, means cooperating with said fuel supply means to cause the latter to limit fuel flow to said engine to prevent the engine from exceeding a predetermined speed when operating as an air compressor, said last mentioned means being rendered effective when said first and second valve means are actuated, and control means operable when in one position to actuate said first and second valve means to convert said engine for use as an air compressor and to render said means cooperating with said fuel supply means effective to cause the latter to limit the speed of said engine to said predetermined speed.

7. The combination of claim 6, including a source of fluid under pressure, and conduit means connecting said first and second valve means and said means cooperating with said fuel supply means with said source, said control means being effective when in said one position to permit fluid under pressure from said source to be applied to said first and second valve means and to exhaust fluid under pressure from said means cooperating with said fuel supply means to render the latter effective to limit fuel flow to said engine when the engine reaches said predetermined speed.

8. The combination of claim 7, in which said control means is effective when in another position to connect said means cooperating with said fuel supply means with said source of fluid under pressure for rendering the latter ineffective at said predetermined speed and to exhaust fluid under pressure from said first and second valve means.

9. The combination of claim 8, in which said conduit means includes a pair of branch conduits, one of said branches being connected to said first and second valve means and the other of said branches being connected to said means cooperating with said fuel supply means, and said control means comprises a four-way valve in said conduit means between said source and said branches, said four-way valve being effective when in one position to connect said one branch with said source of fluid under pressure and to vent said other branch and when in another position to connect said other branch with said source of fluid under pressure and to vent said one branch.

10. In a compression-ignition engine having at least two cylinders, fuel supply means for said engine including fuel supply conduit means having branch passages connected to the respective cylinders and a fuel supply pump connected to said fuel supply conduit means and having a fuel shut off valve, exhaust conduit means for discharging exhaust products from said cylinders including branch conduits connected to the respective cylinders, the exhaust branch conduit connected to one of said cylinders having an auxiliary outlet, means for converting said engine to a self-powered air compressor comprising a source of fluid under pressure, first fluid pressure actuated valve means in the fuel supply branch passage connected to said one cylinder and operable when connected to said source to shut off fuel flow to said one cylinder, second fluid pressure actuated valve means in the exhaust branch conduit connected to said one cylinder and operable when connected to said source of fluid under pressure to divert the exhaust from said one cylinder to said auxiliary outlet, governor means coacting with said fuel supply pump and operable when said first and second valve means are connected to said source for limiting flow from said fuel supply pump to said engine to prevent said engine from exceeding a predetermined speed when the latter is operating as an air compressor, means operable when said first and second valve means are connected to said source and said engine reaches a higher predetermined speed for rendering said shut off valve operable to shut off fuel flow to said engine, and control means for connecting said first and second valve means with said source to render said engine operable as an air compressor.

11. In a vehicle having at least four wheels and a diesel engine power plant having at least two cylinders, fuel supply means for said engine including a fuel supply conduit having branch passages connected to the respective cylinders, exhaust means for discharging exhaust products from said cylinders including branch conduits connected to the respective cylinders, the branch conduit connected to one of said cylinders having an auxiliary outlet, means for converting said engine to a self-powered air compressor comprising a source of fluid under pressure, first valve means in the fuel supply branch passage connected to said one cylinder and operable when connected to said source to shut off fuel flow to said one cylinder, second valve means in the exhaust branch conduit connected to said one cylinder and operable when connected to said source to divert the exhaust to said auxiliary outlet, fluid pressure actuated brake means associated with at least one wheel of said vehicle for preventing movement thereof when parked, said brake means being rendered inoperable when connected to said source, and control means operable when in one position to connect said first and second valve means to said source to convert said engine for operation as an air compressor and to exhaust fluid under pressure from said brake means to actuate the latter, said control means being operable when in another position to exhaust fluid under pressure from said first and second valve means and to connect said brake means with said source to permit operation of said vehicle over the highway.

12. The combination of claim 11, including a valve interposed between said control means and said fluid pressure actuated brake means operable to disconnect said brake means from said control means and said source and to exhaust fluid under pressure from said brake means without converting said engine to a self-powered air compressor.

References Cited

UNITED STATES PATENTS

| | | | |
|---|---|---|---|
| 970,153 | 9/1910 | Winand | 123—52 |
| 1,003,909 | 9/1911 | Jackson | 123—198 |
| 1,013,528 | 1/1912 | Broderick. | |
| 1,489,412 | 4/1924 | Woolson | 180—54 |
| 1,610,099 | 12/1926 | Lemp | 123—198 |
| 1,779,878 | 10/1930 | Gundal | 123—198 |
| 2,091,451 | 8/1937 | Phillips | 123—198 X |
| 2,133,769 | 10/1938 | Jones | 230—41 X |
| 2,627,371 | 2/1953 | Bernal | 230—41 |
| 2,818,931 | 1/1958 | Mallory | 180—54 |
| 3,220,392 | 11/1965 | Cummins | 180—77 X |

BENJAMIN HERSH, *Primary Examiner.*

MILTON L. SMITH, *Examiner.*